United States Patent Office 2,808,700
Patented Oct. 8, 1957

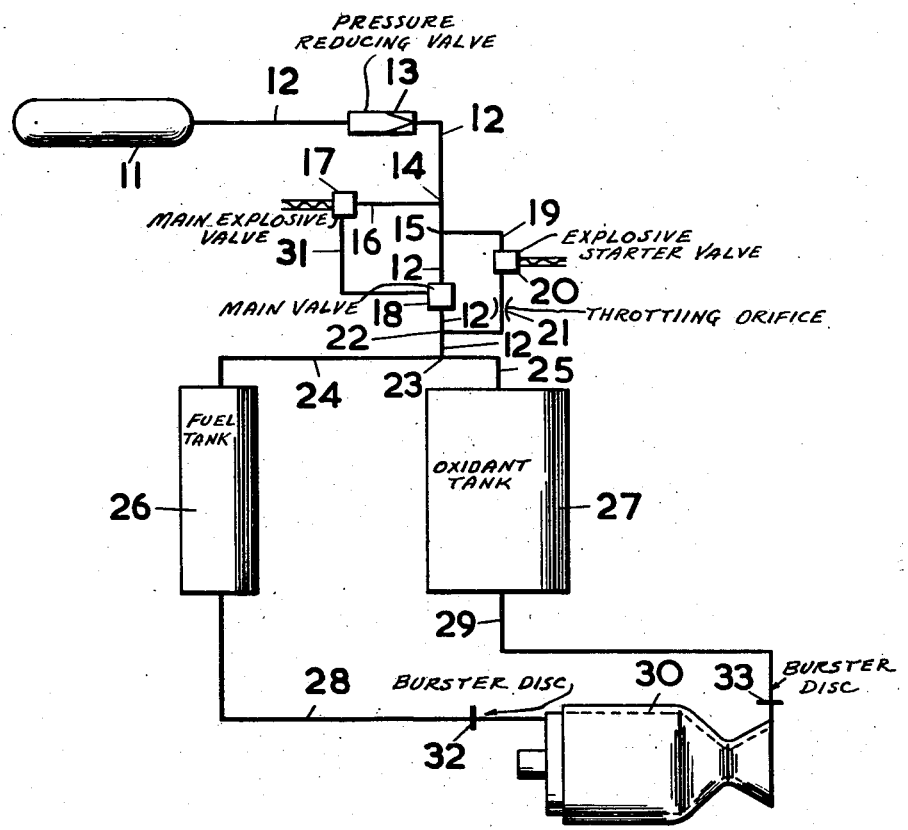

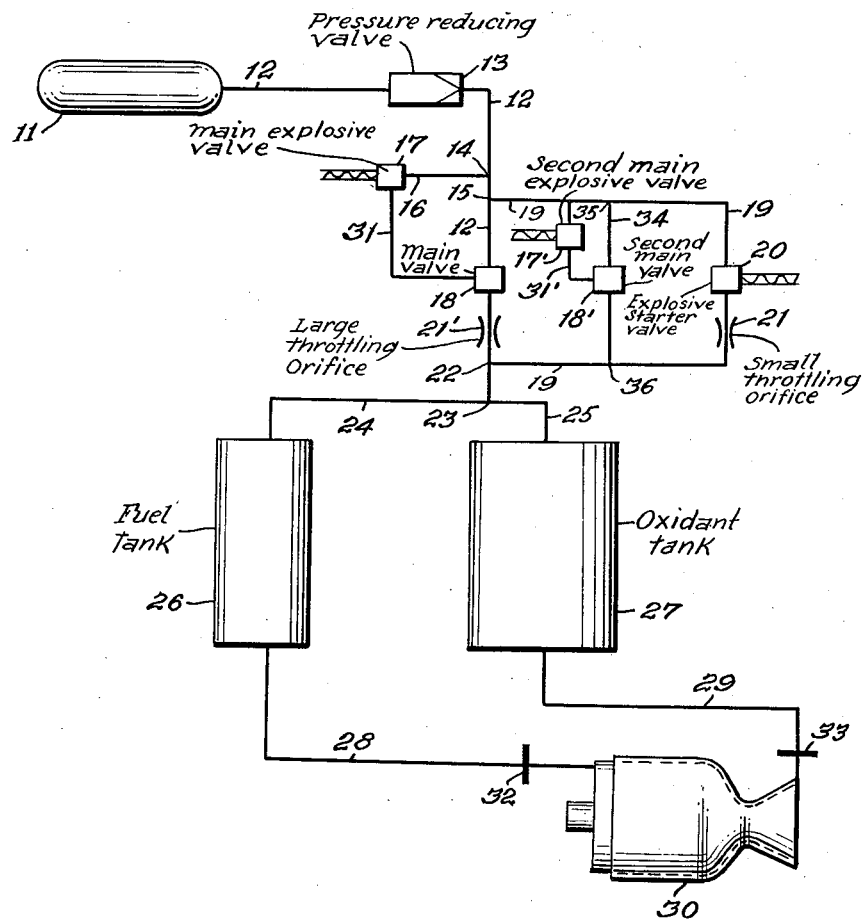

2,808,700

PROPELLANT SUPPLY SYSTEMS FOR JET REACTION MOTORS

Willi Kretschmer, Southcourt, Aylesbury, England, assignor to the Minister of Supply, in Her Majesty's Government of the United Kingdom of Great Britain and Northern Ireland, London, England Application December 11, 1953, Serial No. 397,540

4 Claims. (Cl. 60—35.6)

This invention relates to propellant supply systems for jet reaction motors of the kind in which a supply container for fuel and an oxidant, respectively, are pressurized by connecting them to a source of fluid under pressure, a valve or valves in such connection being opened to effect the supply of fuel and oxidant to the combustion chamber.

The invention relates especially to such jet reaction motors capable of two or more stages of operation affording two or more values of thrust. In a two stage motor, for example, fuel and oxidant may be supplied to the combustion chamber at low pressures (first stage), and, once ignition has taken place and combustion of the mixture in the combustion chamber has become stable, they are supplied at higher pressures to obtain the greater thrust (second stage).

According to the invention, a propellant supply system of the kind referred to, has a main valve provided in the connection from the source of fluid under pressure to the propellant supply containers which is capable of opening automatically when the pressure at the outlet side thereof reaches a given value less than the pressure at its inlet side and this main valve is by-passed by a restricted or throttled connection which is controlled by a starter valve, and in which, for starting, the main valve is closed and the starter valve is opened whereupon the propellants are supplied at relatively low pressure to the combustion chamber until, ignition having taken place and the pressure in the combustion chamber and, therefore, in the propellant containers and at the delivery side of the main valve has increased sufficiently, the main valve is thereby opened automatically and the propellants are supplied at relatively high pressure to the combustion chamber.

Thus in accordance with the invention, a source of fluid at high pressure is connected for starting through a throttle valve to the propellant tanks to supply the propellants, at a relatively low throttled pressure, to the combustion chamber in which latter, following ignition, the pressure, rises above the initial throttled supply pressure and, this pressure acting back through the propellant tanks, opens a main pressure fluid valve, which is by-passed by the throttle valve, against the pressure from the high pressure source which latter high pressure then acts directly on the contents of the propellant tanks to cause the propellants to be supplied at higher presure to the combustion chamber.

Preferably provision is made for closing the main valve and holding it so even when the pressure at its outlet exceeds the given value so that the motor may "idle" at low throttled propellant supply pressure.

A propellant system according to the invention is illustrated diagrammatically by the accompanying drawings wherein:

Figure 1 shows a two stage propellant supply system in accordance with my invention, and Figure 2 is a diagram similar to that shown in Figure 1 but modified so as to provide three stage operation.

As shown in Figure 1, the interior of a container 11 for high pressure air or nitrogen is connected by a main pipe line 12 through a pressure reducing valve 13 to a pipe line junction 14. From the main pipe line junction 14 a subsidiary branch 16 leads to a main explosive valve 17 and the main pipe line 12 leads to a second junction 15. From the junction 15 the main pipe line 12 leads through a main valve 18 which is capable of opening automatically when the pressure at the outlet side thereof reaches a given value less than that at its inlet side (such as a valve of the type illustrated in the British patent to Coxon No. 126,554, dated May 15, 1919) and a by-pass branch pipe 19 leads through an explosive starter valve 20 and a throttle or restriction 21 to rejoin the main pipe line 12 at a further junction 22. The main explosive valve 17 is also connected through a pipe 31 to the main valve 18. From the junction 22 the main pipe line 12 continues to another junction 23 from which branches 24 and 25 lead to two propellant containers 26 and 27, for fuel (kerosene) and for oxidant (hydrogen peroxide), respectively. Fuel and oxidant supply pipes 28 and 29 lead to the combustion chamber 30 of a jet reaction motor.

In the condition prior to starting, both the main valve 18 and the starter explosive valve 20 are closed and the air or nitrogen at high pressure in the container 11 is not transmitted to the containers 26, 27. To supply fuel and oxidant for starting and low thrust running the starter explosive valve 20 is fired electrically and air or nitrogen, under pressure from the container 11, flows via the reducing valve 13, now open explosive valve 20 and throttle 21 to the containers 26 and 27 through the associated pipes as shown. This pressure causes fuel and oxidant to be supplied to the pipes 28 and 29, respectively, and when a predetermined pressure is reached, in this case 50 lbs./sq. inch, two burster discs 32 and 33, one in each pipe, are fractured by the pressure of the fuel and oxidant which are then supplied to the combustion chamber. Following ignition of the fuel and oxidant by any convenient manner in the combustion chamber the pressure therein rises. This pressure acts back through the containers 26 and 27, and, when it exceeds a predetermined value, in this case 170 lbs./sq. inch, the main air valve 18 is forced open by this pressure against the pressure of air or nitrogen from the container 11. Once the main valve 18 has opened the high pressure of air or nitrogen from the container 11, after passing the reducing valve 13 is free to act directly on the fuel and oxidant in the containers 26 and 27 through the valve 18. This causes the fuel and oxidant to be supplied at the higher rate necessary for full thrust running of the motor.

To return the motor to low thrust running the main explosive valve 17 is fired and this re-closes the main valve 18.

It will be apparent to those skilled in the art that the invention can readily be employed to afford three or even more stages of operation. A three stage system is shown in Figure 2 wherein an additional pipe line 34 is provided between junctions 35 and 36, pipe line 34 being provided with a second main valve 18' identical with main valve 18 but adapted to open at a back pressure greater than the back pressure for which valve 18 is set to open. A throttle 21' must be included in pipe line 12 downstream of valve 18 and upstream of junction 22 in order that pipe line 12 be more restricted than pipe line 34 but less restricted than pipe line 19. A second main explosive valve 17' is connected in the pipe line 31' between second main valve 18' and pipe line 19 between junctions 15 and 35.

The operation of the modification is identical with the operation of the basic invention except that the opening of valve 18 following the opening of valve 20 does not permit the full pressure at junction 15 to act upon containers 26 and 27 due to the effect of throttle 21'. An additional increase of back pressure at the outlet of valve 18' sufficient to meet the preset opening differential pressure for valve 18' will cause that valve to open. Now the full pressure of the fluid at junction 15 acts through pipe line 34 and upon containers 26 and 27. The operation of valve 17' in re-closing valve 18' is identical to the operation of valve 17 in re-closing valve 18.

I claim:

1. In a propellant supply system for a jet reaction motor, a source of fluid under pressure, a fuel tank, an oxidant tank, a fluid connection from said source to said tanks, a normally closed main valve in said connection, said main valve opening in response to a rise in pressure at its outlet to a predetermined value less than the pressure at its inlet, a by-pass in said connection about said main valve and including a starter valve and a throttling orifice in series, a reaction motor, and discrete pressure fluid connections from each of said tanks to said motor.

2. A propellant system as recited in claim 1, a passageway between said main valve and the side of said fluid connection upstream of said main valve, and an explosive valve in said passageway to close said main valve in response to opening of said explosive valve.

3. In a propellant supply system for a jet reaction motor, a source of fluid under pressure, a fuel tank, an oxident tank, a motor, fluid pressure lines from each said tank to said motor, a main fluid pressure connection from said source to said tanks and including first, second and third branches in parallel, a first main valve in said first branch, a second main valve in said second branch, said first and second main valves being normally closed, said first main valve opening by and in response to a first predetermined back pressure at its outlet less than the pressure at its inlet, said second main valve opening by and in response to a second predetermined rise in back pressure at its outlet, said second rise in back pressure being greater than said first rise in back pressure, and a starter valve, a first throttling orifice in series sequence in said third branch, and a second throttling orifice in said first branch in series sequence with said first main valve, said second throttling orifice being less restricted than said first throttling orifice.

4. A propellant system as recited in claim 3, a passageway between each said main valve and the side of said fluid connection upstream of said main valves, and an explosive valve in said passageway to close said main valves in response to opening of said explosive valve.

References Cited in the file of this patent

UNITED STATES PATENTS

| | | |
|---|---|---|
| 2,398,201 | Young et al. | Apr. 9, 1946 |
| 2,402,826 | Lubbock | June 25, 1946 |
| 2,601,607 | Halford et al. | June 24, 1952 |

FOREIGN PATENTS

| | | |
|---|---|---|
| 749,050 | Great Britain | May 16, 1956 |